United States Patent
Cho

(10) Patent No.: US 7,639,317 B2
(45) Date of Patent: Dec. 29, 2009

(54) BACKLIGHT UNIT OF LIQUID CRYSTAL DISPLAY DEVICE

(75) Inventor: Ki Hyun Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 338 days.

(21) Appl. No.: 11/640,307

(22) Filed: Dec. 18, 2006

(65) Prior Publication Data

US 2007/0279548 A1  Dec. 6, 2007

(30) Foreign Application Priority Data

Jun. 1, 2006  (KR) .................. 10-2006-0049440

(51) Int. Cl.
*G02F 1/1335* (2006.01)
(52) U.S. Cl. .................. 349/61; 349/62; 349/63; 349/64; 349/65; 349/66; 349/67; 349/68; 349/69; 349/70; 349/71; 362/612
(58) Field of Classification Search .............. 349/61–71
See application file for complete search history.

(56) References Cited

U.S. PATENT DOCUMENTS

| 7,436,468 | B2* | 10/2008 | Song et al. ............. 349/61 |
| 7,548,287 | B2* | 6/2009 | Oh ............. 349/65 |
| 2005/0259195 | A1* | 11/2005 | Koganezawa ............. 349/65 |
| 2006/0061705 | A1* | 3/2006 | Onishi ............. 349/62 |
| 2008/0002099 | A1* | 1/2008 | Oh ............. 349/65 |

* cited by examiner

*Primary Examiner*—David Nelms
*Assistant Examiner*—Thanh-Nhan P Nguyen
(74) *Attorney, Agent, or Firm*—Holland & Knight LLP

(57) ABSTRACT

A backlight unit of a liquid crystal display device includes a mold frame having a receiving space for receiving a reflection sheet, a prism sheet a diffusion sheet, a plurality of light-emitting diodes, and a shielding tape for affixing the reflection sheet, the prism sheet, the plurality of light-emitting diodes and the diffusion sheet within the receiving space, wherein a first color is colored at a plurality of first colored areas at a lower surface of the shielding tape corresponding to the plurality of light-emitting diodes and a second color is colored at a remaining area of the lower surface of the shielding tape other than the plurality of first colored areas.

9 Claims, 7 Drawing Sheets

BACKLIGHT UNIT OF LIQUID CRYSTAL DISPLAY DEVICE

This application claims the benefit of Korean Patent Application No. P06-0049440 filed in Korea on Jun. 1, 2006, which is hereby incorporated by reference in its entirety.

BACKGROUND OF THE INVENTION

1. Field of the Invention

Embodiments of the invention relate to a display device, and more particularly to a backlight unit of liquid crystal display device. Although embodiments of the invention are suitable for a wide scope of applications, it is particularly suitable for preventing a hot spot phenomenon in which a position of a light source is so bright as to be recognized through a liquid crystal display panel.

2. Description of the Related Art

Generally, a liquid crystal display device controls light transmittance of liquid crystal cells in accordance with video signals to display a picture. An active matrix type of liquid crystal display device having a switching device provided for each liquid crystal cell is advantageous in the implementation of displaying moving pictures because each liquid crystal cell can be actively controlled. The switching device used for the active matrix liquid crystal display device employs a thin film transistor (hereinafter, referred to as "TFT").

FIG. 1 is an equivalent circuit diagram of a pixel provided in the related art liquid crystal display device. Referring to FIG. 1, the active matrix LCD converts a digital input data into an analog data voltage on the basis of a gamma reference voltage and then supplies the analog data voltage to a data line DL while at the same time a scanning pulse is supplied to a gate line GL to thereby charge a liquid crystal cell Clc. A gate electrode of the TFT is connected to the gate line GL while a source electrode thereof is connected to the data line DL. Further, a drain electrode of the TFT is connected to a pixel electrode of the liquid crystal cell Clc and to one electrode of a storage capacitor Cst. A common electrode of the liquid crystal cell Clc is supplied with a common voltage Vcom.

The storage capacitor Cst is charged by a data voltage fed from the data line DL when the TFT is turned-on, thereby constantly keeping a voltage on the liquid crystal cell Clc. If the scanning pulse is applied to the gate line GL, then the TFT is turned on to provide a channel between the source electrode and the drain electrode thereof, thereby allowing a voltage on the data line DL to be supplied to the pixel electrode of the liquid crystal cell Clc. In this case, liquid crystal molecules of the liquid crystal cell have an alignment change due to an electric field between the pixel electrode and the common electrode, to thereby modulate an incident light passing through the liquid crystal molecules.

FIG. 2 is a block diagram showing a configuration of the related art liquid crystal display device. More particularly, FIG. 2 is block diagram of a configuration for a small-size liquid crystal display device used in a cell phone. Referring to FIG. 2, the related art liquid crystal display device 100 includes a liquid crystal display panel 110 provided with a thin film transistor TFT driving the liquid crystal cell Clc and positioned where data lines DL1 to DLm and gate lines GL1 to GLn cross each other, a data driver 120 supplying a data to the data lines DL1 to DLm of the liquid crystal display panel 110, a gate driver 130 supplying a scanning pulse to the gate lines GL1 to GLn of the liquid crystal display panel 110, a gamma reference voltage generator 140 generating a gamma reference voltage to supply it to the data driver 120, a backlight unit 150 for irradiating light onto the liquid crystal display panel 110, a common voltage generator 160 generating a common voltage Vcom to supply to the common electrode of the liquid crystal cell Clc of the liquid crystal display panel 110, a gate driving voltage generator 170 generating a gate high voltage VGH and a gate low voltage VGL to supply to the gate driver 130, and a timing controller 180 controlling the data driver 120 and the gate driver 130.

The liquid crystal display panel 110 has a liquid crystal molecules positioned between two glass substrates. On the lower glass substrate of the liquid crystal display panel 110, the data lines DL1 to DLm and the gate lines GL1 to GLn perpendicularly cross each other. TFTs are provided adjacent to crossings between the data lines DL1 to DLm and the gate lines GL1 to GLn. The TFTs supply data on the data lines DL1 to DLm to the liquid crystal cells Clc in response to scanning pulses. The gate electrodes of the TFTs are connected to the gate lines GL1 to GLn while the source electrodes thereof are connected to the data lines DL1 to DLm. Further, the drain electrode of the TFTs is connected to the pixel electrodes of the liquid crystal cells Clc and to the storage capacitors Cst.

The gamma reference voltage generator 140 receives a high-level supply voltage VDD to generate a positive gamma reference voltage and a negative gamma reference voltage and outputs them to the data driver 120. The common voltage generator 160 receives a high-level supply voltage VDD to generate a common voltage Vcom, and supplies it to the common electrode of the liquid crystal cell Clc provided in each pixel of the liquid crystal display panel 110.

The gate driving voltage generator 170 is supplied with a high-level supply voltage VDD to generate the gate high voltage VGH and the gate low voltage VGL, and supplies them to the gate driver 130. Herein, the gate driving voltage generator 170 generates a gate high voltage VGH higher than a threshold voltage of the TFT provided in each pixel of the liquid crystal display panel 110 and a gate low voltage VGL lower than the threshold voltage of the TFT. The gate high voltage VGH and the gate low voltage VGL generated in this manner are used for determining a high level voltage and a low level voltage of the scanning pulse generated by the gate driver 130, respectively.

The timing controller 180 supplies a digital video data RGB from a digital video card (not shown) to the data driver 120 and, at the same time, generates a data driving control signal DCC and a gate driving control signal GDC using horizontal/vertical synchronizing signals H and V in response to a clock signal CLK to supply them to the data driver 120 and the gate driver 130, respectively. Herein, the data driving control signal DDC includes a source shift clock SSC, a source start pulse SSP, a polarity control signal POL and a source output enable signal SOE, etc. The gate driving control signal GDC includes a gate start pulse GSP and a gate output enable signal GOE, etc.

The data driver 120 supplies a data to the data lines DL1 to DLm in response to a data driving control signal DDC supplied from the timing controller 180. Further, the data driver 120 samples and latches a digital video data RGB fed from the timing controller 180, and then converts it into an analog data voltage capable of expressing a gray scale level at the liquid crystal cell Clc of the liquid crystal display panel 110 on the basis of a gamma reference voltage from the gamma reference voltage generator 140. The analog data voltage is then supplied to the data lines DL1 to DLm.

The gate driver 130 sequentially generates scanning pulses, that is, gate pulses in response to a gate driving control signal GDC and a gate shift clock GSC supplied from the timing controller 180 and then supplies the scanning pulses to the gate lines GL1 to GLn. The gate driver 130 determines a high level voltage and a low level voltage of the scanning pulse in accordance with the gate high voltage VGH and the gate low voltage VGL supplied from the gate driving voltage generator 170. The TFTs are turned-on in response to scanning pulses applied, via the gate lines GL1 to GLn, to the gate terminals thereof. Upon turning-on of the TFTs, a video data on the data lines DL1 to DLm is supplied to the pixel electrodes of the liquid crystal cells Clc.

The backlight unit 150 is provided at the rear side of the liquid crystal display panel 110. The backlight unit 150 radiates light onto each pixel of the liquid crystal display panel 110 in response to an alternating current voltage and a current supplied from the inverter 160. The backlight unit 150 can be either edge type or direct type.

The related art backlight unit includes a plurality of light-emitting diodes that each irradiate light as a point light source. Since the light-emitting diodes and the liquid crystal display panel 110 are integral and integrated to an upper housing (not shown), such as in a cell phone, then the light-emitting diodes and the liquid crystal display panel 110 are positioned closely adjacent to each other unlike in large-sized electronics, such as a TV display panel that have a relatively large space between the light-emitting diodes and the liquid crystal display panel. Accordingly, a hot spot phenomenon can occur in small-sized electronics in which the positions of the light-emitting diodes are distinctively recognizable through the liquid crystal display panel 110 when the light-emitting diodes are radiating light. Such hot spots deteriorate the quality of images displayed on the liquid crystal display panel 110.

SUMMARY OF THE INVENTION

Accordingly, embodiments of the invention is directed to a backlight unit of liquid crystal display device that substantially obviates one or more of the problems due to limitations and disadvantages of the related art.

An object of embodiments of the invention is to provide a backlight unit that is capable of preventing a hot spot phenomenon in which a position of a light source for a liquid crystal display device is distinguishably visible through the liquid crystal display panel.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a backlight unit of a liquid crystal display device includes a mold frame having a receiving space for receiving a reflection sheet, a prism sheet a diffusion sheet, a plurality of light-emitting diodes, and a shielding tape for affixing the reflection sheet, the prism sheet, a plurality of light-emitting diodes and the diffusion sheet within the receiving space, wherein a first color is colored at a plurality of first colored areas at a lower surface of the shielding tape corresponding to the plurality of light-emitting diodes and a second color is colored at a remaining area of the lower surface of the shielding tape other than the plurality of first colored areas.

In another aspect, a backlight unit of a liquid crystal display device includes a mold frame having a receiving space, a reflection sheet positioned within the receiving space, a diffusion sheet positioned within the receiving space, a plurality of light-emitting diodes positioned within the receiving space, and a shielding tape for affixing the reflection sheet, the plurality of light-emitting diodes and the diffusion sheet within the receiving space, wherein a first color is colored at a plurality of first colored areas at a lower surface of the shielding tape corresponding to the plurality of light-emitting diodes and a second color is colored at a remaining area of the lower surface of the shielding tape other than the plurality of first colored areas.

A backlight unit of a liquid crystal display device includes a mold frame having a receiving space, a reflection sheet positioned within the receiving space, a diffusion sheet positioned within the receiving space, a plurality of light-emitting diodes positioned within the receiving space, and a shielding tape attached to the diffusion sheet and to a rim of the mold frame about a periphery of the receiving space with an adhesive, wherein a first color is colored at a plurality of first colored areas at a lower surface of the shielding tape corresponding to the plurality of light-emitting diodes and a second color is colored at a remaining area of the lower surface of the shielding tape other than the plurality of first colored areas.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Figure 1:
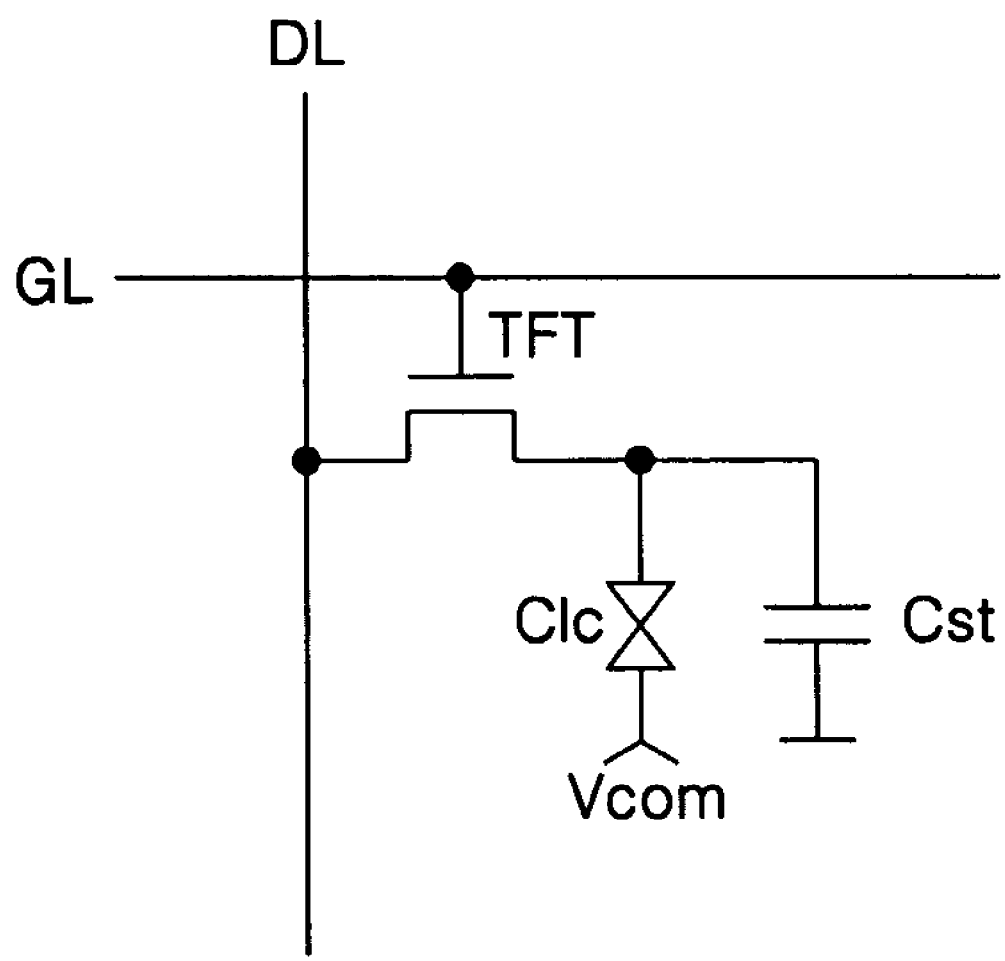
FIG. 1 is an equivalent circuit diagram of a pixel provided in the related art liquid crystal display device.
Figure 2:
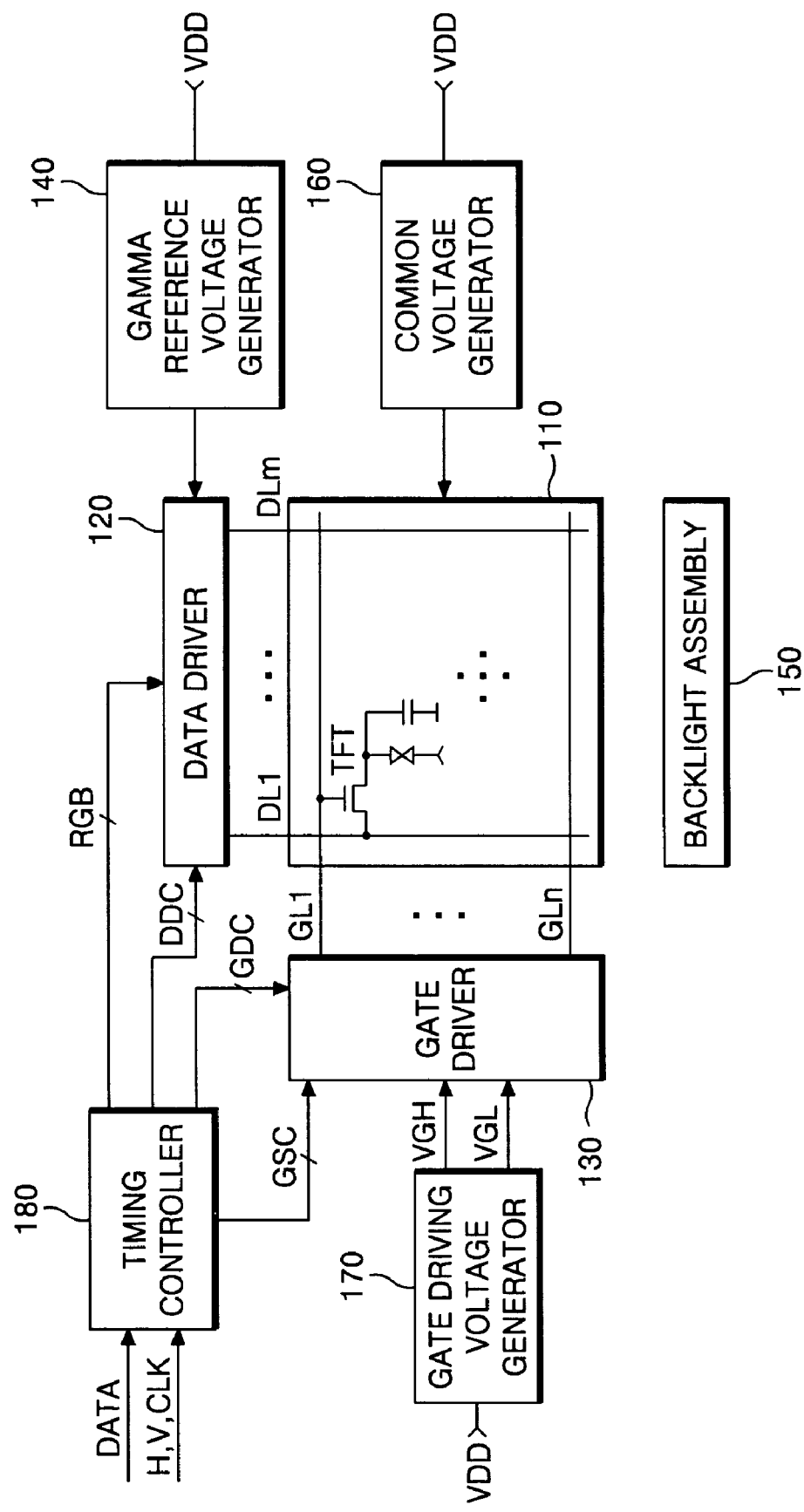
FIG. 2 is a block diagram showing a configuration of the related art small-size liquid crystal display device.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 3:
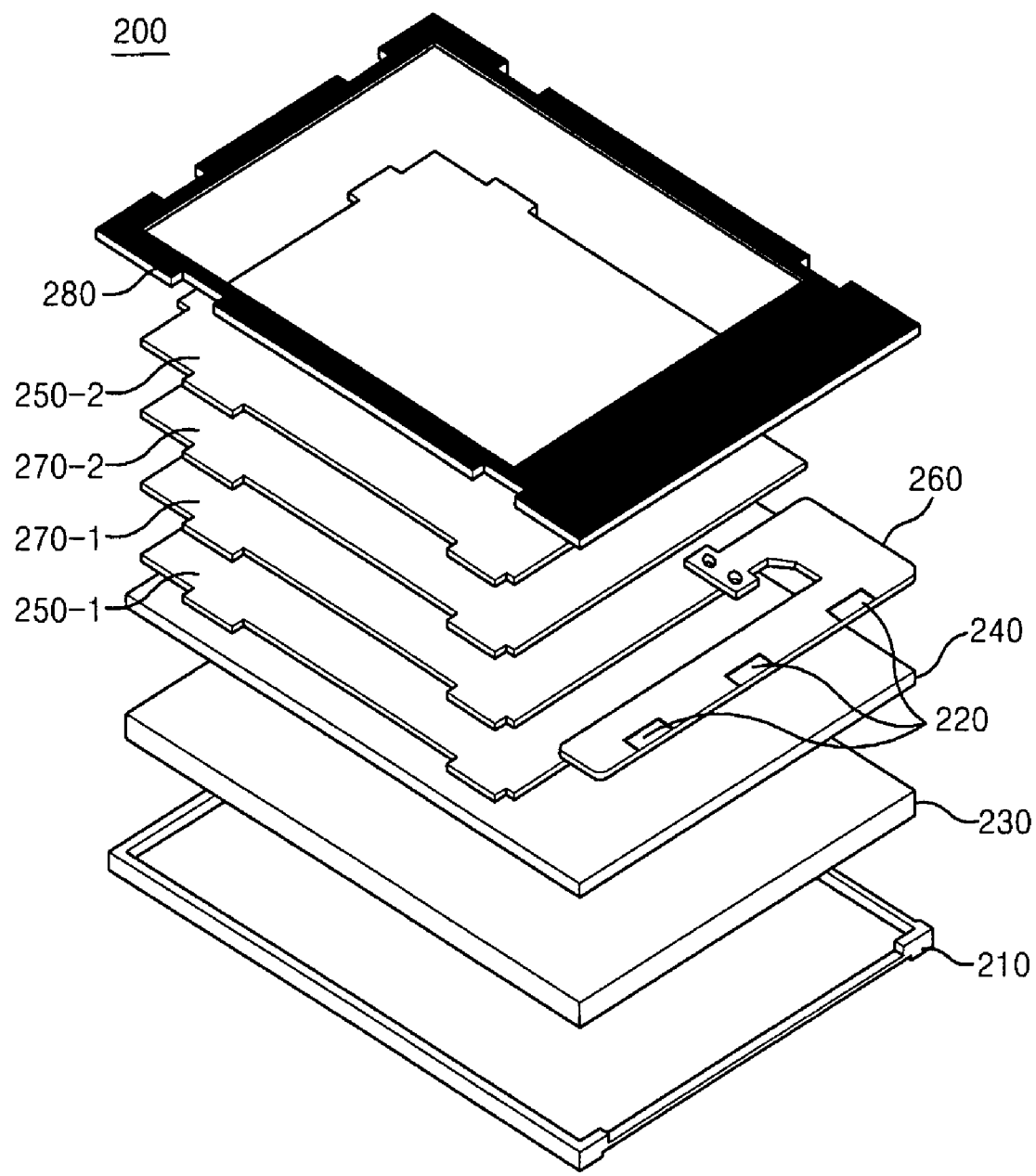
FIG. 3 is an expanded perspective view of a backlight assembly according to an embodiment of the invention.

FIG. 3 is an expanded perspective view of a backlight assembly according to an embodiment of the invention.

Referring to FIG. 3, a backlight unit 200 according to an embodiment of the invention includes a mold frame 210, a plurality of light-emitting diodes 220, a reflection sheet 230, a light guide plate 240, a first diffusion sheet 250-1, a FPC (Flexible Printed Circuit) 260, a first and second prism sheets 270-1 and 270-2, a second diffusion sheet 250-2, and a shielding tape 280. Each of the plurality of light-emitting diodes 220 are point light sources. The reflection sheet 230 reflects light irradiated from the light-emitting diodes 220 toward the liquid crystal display panel (not shown). The light guide plate 240 redirects and converts the point light irradiated from the light-emitting diodes 220 into a surface light emitted toward the liquid crystal display panel (not shown). The first diffusion sheet 250-1 diffuses light emitted from the light guide plate 240. The FPC 260 is connected to the light-emitting diodes 220. The first and second prism sheets 270-1 and 270-2 condense light diffused by the first diffusion sheet 250-1. The second diffusion sheet 250-2 diffuses a light condensed by the first and second prism sheets 270-1 and 270-2. The shielding tape 280 prevents light from diverging out of the backlight unit 200.

Figure 4:
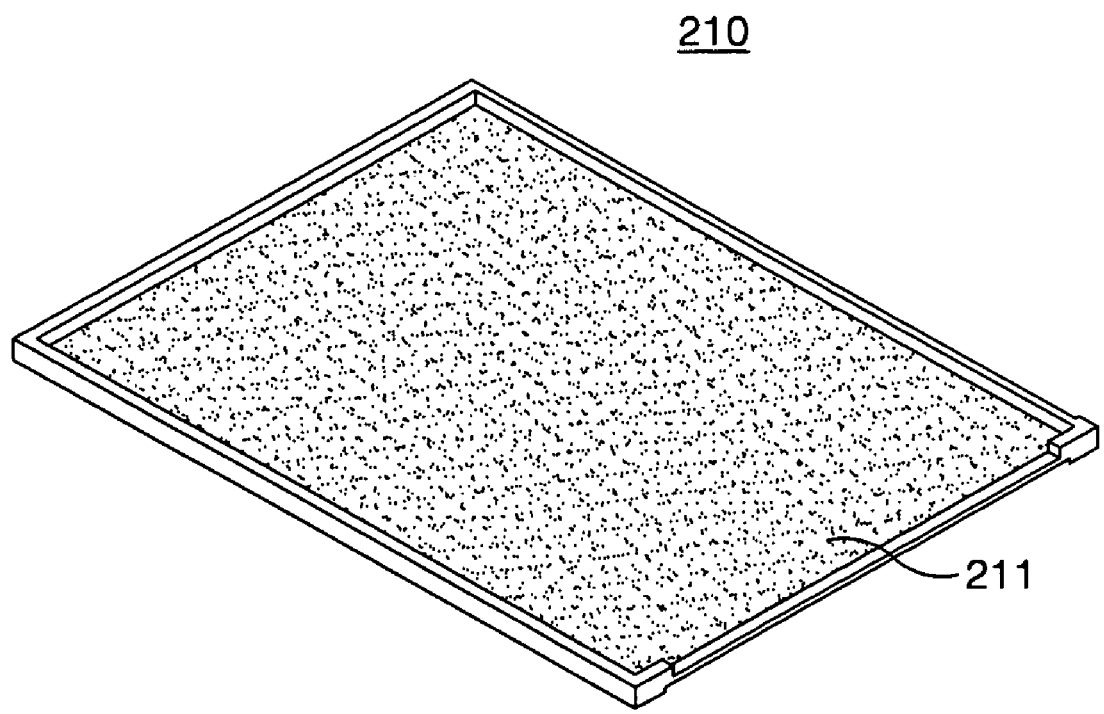
FIG. 4 is a perspective view of the mold frame in FIG. 3.

FIG. 4 is a perspective view of the mold frame in FIG. 3. As shown in FIG. 4, a receiving space 211 is formed within an opening of the mold frame 210. The plurality of light-emitting diodes 220, the reflection sheet 230, the light guide plate 240, the first diffusion sheet 250-1, the FPC 260, the first and second prism sheets 270-1 and 270-2, the second diffusion sheet 250-2 and the shielding tape 280, as shown in FIG. 3, are sequentially disposed and received in the receiving space 211. The reflection sheet 230 is positioned at the lowest position in the receiving space and the shielding tape 280 is positioned at the highest position to affix the backlight unit together.

The reflection sheet 230 is arranged in such a manner as to contact a bottom surface of the receiving space 211 of the mold frame 210. The reflection sheet 230 reflects a light irradiated from the light-emitting diodes 220 toward a liquid crystal display panel (not shown). The light guide plate 240 is mounted in the receipt space 211 of the mold frame 210 between an upper surface of the reflection sheet 230 and a lower surface of the first diffusion sheet 250-1 to convert and redirect a point light irradiated from the light-emitting diodes 220 into a surface light irradiate toward a liquid crystal display panel (not shown).

Figure 5:
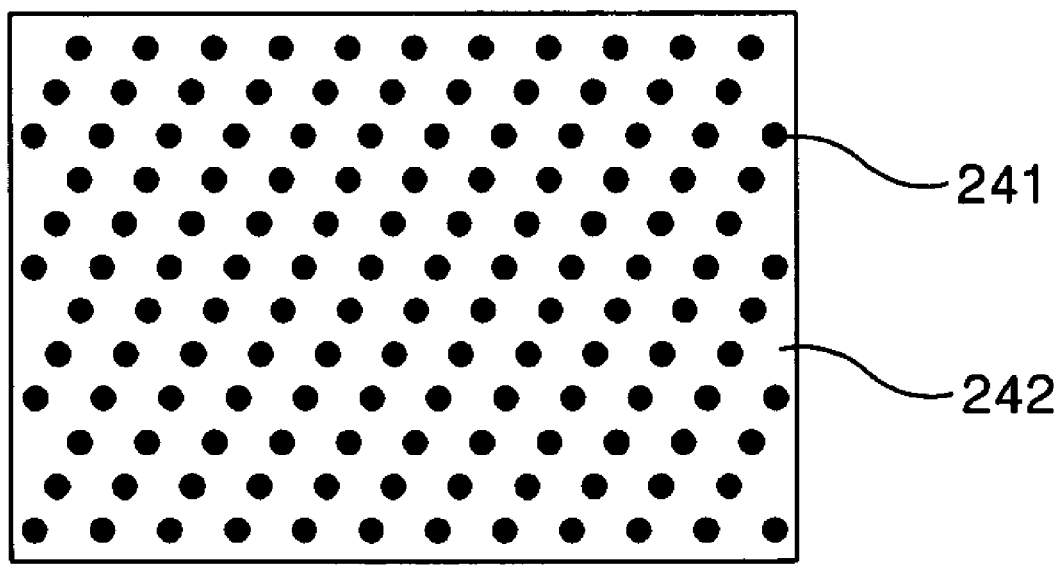
FIG. 5 is a diagram showing a light guide plate pattern formed at a lower surface of a light guide plate in FIG. 3.

FIG. 5 is a diagram showing a light guide plate pattern formed at a lower surface of a light guide plate in FIG. 3. Referring to FIG. 5, a light guide plate pattern 242 is formed at a lower surface of the light guide plate 240. The light guide plate pattern 242 includes a plurality of dots 241 arranged in such a manner as to have constant spacing.

The light guide plate 240 receives point light incident from the light-emitting diodes 220 from a side surface, and then both scatters and reflects the light via a plurality of dots 241 provided at the lower surface of the light guide plate pattern 242 to form surface light. Next, the light guide plate 240 irradiates light across the whole upper surface of the light guide plate 240 toward a liquid crystal display panel (not shown).

The first diffusion sheet 250-1 is mounted in the receiving space 211 of the mold frame 210. The first diffusion sheet 250-1 is arranged between an upper surface of the light guide plate 240 and a lower surface of the first prism sheet 270-1 to diffuse surface light irradiated from the light guide plate 240. If the surface light scattered-reflected and irradiated from the dots 241 of the light guide plate pattern 242 is not diffused, then some light may be shown as a point shape through the liquid crystal display panel (not shown). To prevent the appearance of a point light, the first diffusion sheet 250-1 diffuses the surface light scattered-reflected and irradiated by the light guide plate 240.

The FPC 260 is positioned between an upper surface of the first diffusion sheet 250-1 and a lower surface of the first prism sheet 270-1 within the receiving space 211 of the mold frame 210. Since the FPC 260 has a very small area and a very short length in comparison to the first diffusion sheet 250-1 and the first prism sheet 270-1, the FPC 260 is positioned at one side of both the first diffusion sheet 250-1 and the first prism sheet 270-1. The light-emitting diodes 220 are connected at one side of the FPC 260 facing both the first diffusion sheet 250-1 and the first prism sheet 270-1.

The first prism sheet 270-1 is mounted in the receiving space 211 of the mold frame 210 between an upper surface of the diffusion sheet 250-1 and a lower surface of the second prism sheet 270-2 to condense light diffused by the first diffusion sheet 250-1. The second prism sheet 270-2 is mounted in the receiving space 211 of the mold frame 210 between an upper surface of the first prism sheet 270-1 and a lower surface of the second diffusion sheet 280 to again condense light diffused by the first prism sheet 270-1. The second diffusion sheet 250-2 is mounted in the receiving space 211 of the mold frame 210 at an upper surface of the second prism sheet 270-2 to diffuse a light condensed by the first prism sheet 270-1.

The shielding tape 280 is adhered to sides of the upper surface of the second diffusion sheet 250-2 and to the rim of the mold frame 21O. Since an upper surface and a lower surface of the shielding tape 280 are coated with an adhesive, the adhesive at the lower surface of the shielding tape affixes the plurality of light-emitting diodes 220, the reflection sheet 230, the light guide plate 240, the first diffusion sheet 250-1, the FPC 260, the first and second prism sheets 270-1 and 270-2, and the second diffusion sheet 250-2 within the receiving space 211 of the mold frame 210, and can also adhere the backlight unit to the lower surface of a liquid crystal display panel (not shown).

Figure 6A:
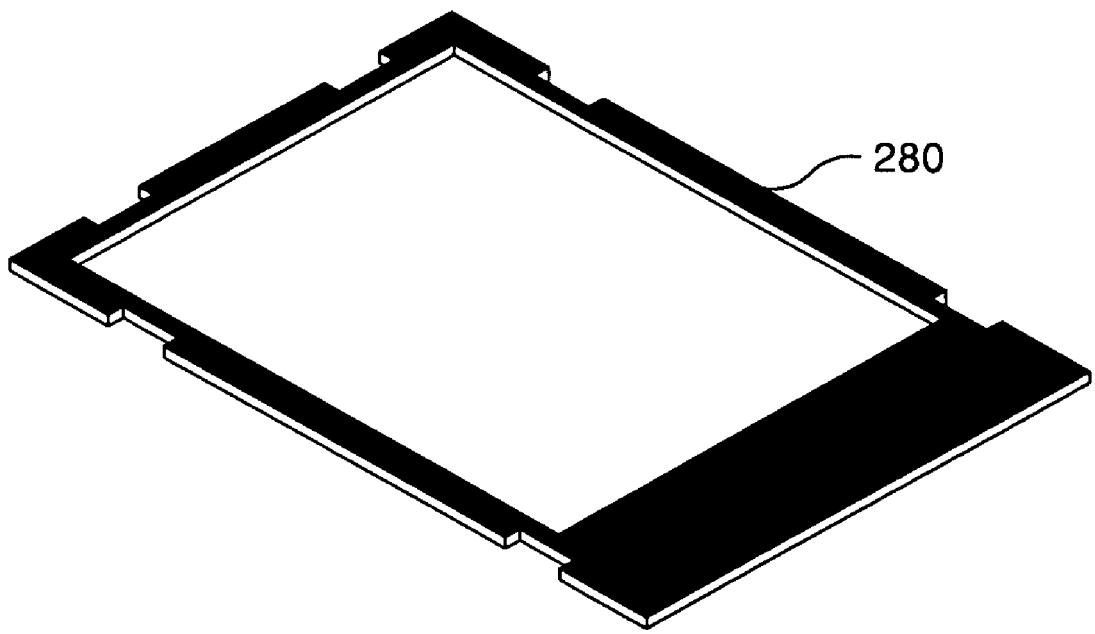
FIG. 6A is a plan view of an upper surface of the shielding tape in FIG. 3.

FIG. 6A is a plan view of an upper surface of the shielding tape in FIG. 3. As shown in FIG. 6A, the shielding tape 280 is implemented as a square shape that is attached at the rim of the mold frame 210 about the periphery of the receiving space 211 and has an opening in the middle through which the surface light transmits. The whole upper surface of the shielding tape 280 is colored black and coated with an adhesive.

Figure 6B:
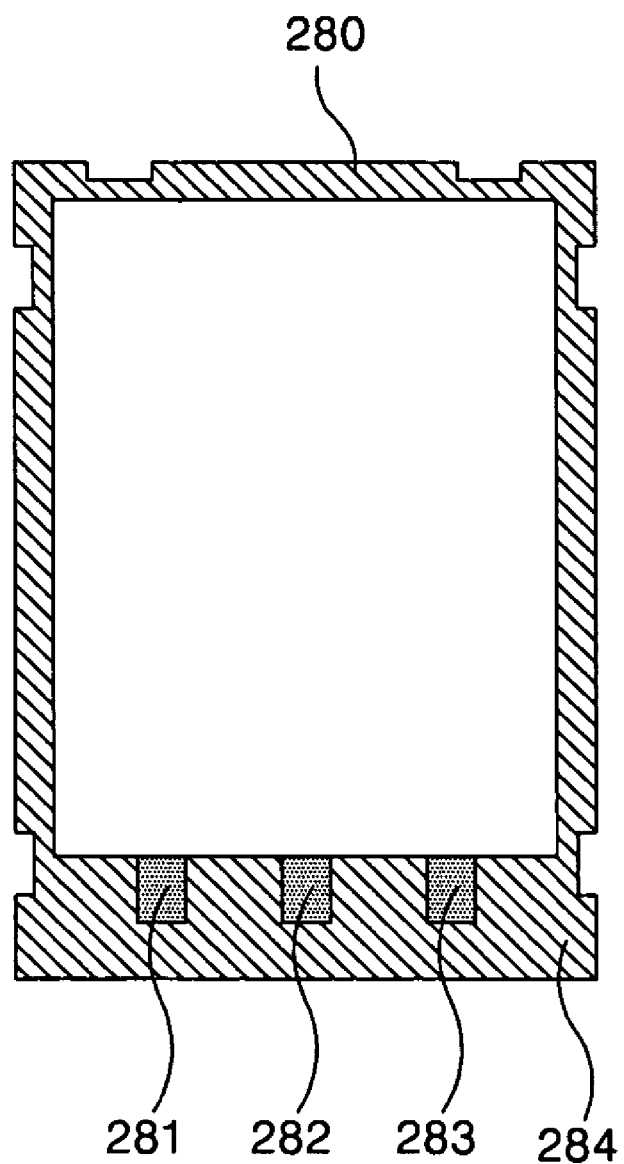
FIG. 6B is a plan view of a lower surface of the shielding tape in FIG. 3.

FIG. 6B is a plan view of a lower surface of the shielding tape in FIG. 3. As shown in FIG. 6B, an adhesive is coated on a whole lower surface of the shielding tape 280 and color areas 281 to 283 having a brightness so as to contrast with the whole lower surface of the shielding tape 280 are placed in correspondence with the light-emitting diodes. In other words, each of the color areas 281 to 283 is positioned over one of the three light-emitting diodes 220 connected to one side of the FPC 260. Thus, the color areas 281 to 283 are spaced apart like the three light-emitting diodes 220 are spaced apart.

In a first method of arranging the colors at the lower surface of the shielding tape 280, the first to third colored areas 281 to 283 corresponding in a vertical direction with three light-emitting diodes are a black color while the remaining area 284 of the lower surface of the shielding tape 280, other than a first to third colored areas 281 to 283 is a white color. If a white color and a black color are arranged in such a manner at a lower surface of the shielding tape 280, then the black colors will absorb light irradiated from three light-emitting diodes 220 while the white color reflects light to brighten the remaining area 284. Thus, the first to third colored areas 281 to 283 are darkened while the fourth colored area 284 is brightened to suppress the hot spot phenomenon that would otherwise be indicative of the position of the light-emitting diodes.

In a second method of arranging the colors, a gray color having a brightness relatively lower than a white color is colored at the first to third colored areas 281 to 283 corresponding in a vertical direction with three light-emitting diodes at a lower surface of the shielding tape 280 while a white color having a higher brightness is colored at the remaining area 284 of a lower surface of the shielding tape 280. Brightness of a light reflected by a gray color colored at the first to third colored areas 281 to 283 is relatively lower than that of a light reflected by a white color colored in the remaining area 284. Thus, the first to third colored areas 281 to 283 are darkened while the fourth colored area 284 is brightened to suppress the hot spot phenomenon that would otherwise be indicative of the position of the light-emitting diodes.

In a third method of arranging the colors, a black color having a lowest brightness is colored at a first to third colored areas 281 to 283 corresponding in a vertical direction with three light-emitting diodes among whole areas of a lower surface of the shielding tape 280 while a gray color having a brightness relatively higher than a black color is colored at the remaining area 284 of a lower surface of the shielding tape 280. If a grey color and a black color are arranged in such a manner at a lower surface of the shielding tape 280, then the black colors will absorb light irradiated from three light-emitting diodes 220 while the grey color reflects light to brighten the remaining area 284. Thus, the first to third colored areas 281 to 283 are darkened while the fourth colored area 284 is brightened to suppress the hot spot phenomenon that would otherwise be indicative of the position of the light-emitting diodes.

In a fourth method of arranging the colors, a white color is colored at a first to third colored areas 281 to 283 corresponding in a vertical direction with three light-emitting diodes among whole areas of a lower surface of the shielding tape 280, and a metal having a reflectance higher than the white color is coated at the remaining area 284 of a lower surface of the shielding tape 280. Herein, since a metal material having a high reflectance is coated at the remaining area 284 so as to have a silver color, the remaining area 284 has a reflectance higher than a white color colored at the first to third colored areas 281 to 283. Although a white color having a high brightness is colored at the first to third colored areas 281 to 283, a silver color at the remaining area 284 has a reflectance higher than the white color. Thus, the first to third colored areas 281 to 283 are darkened while the fourth colored area 284 is brightened to suppress the hot spot phenomenon that would otherwise be indicative of the position of the light-emitting diodes.

Embodiments of the invention darken first to third colored areas 281 to 283 of the lower surface of the shielding tape 280 corresponding in a vertical direction with three light-emitting diodes 220 while brightening the remaining area 284 of the lower surface of the shielding tape 280. Thus, methods of arranging the colors other than the above-mentioned four methods of arranging the colors can also be used. As described above, embodiments of the invention modify the lower surface of a shielding tape to absorb a light at a positions corresponding to the light sources and to reflect a light at the remaining areas of the shielding tape that do not correspond to a light source. As a result, embodiments of the invention prevent a hot spot phenomenon in which a position of a light source is recognized on a liquid crystal display panel so that the display quality of the liquid crystal display panel is improved.

It will be apparent to those skilled in the art that various modifications and variations can be made in the backlight unit of liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A backlight unit of a liquid crystal display device, comprising:
    a mold frame having a receiving space for receiving a reflection sheet, a prism sheet, a diffusion sheet, a plurality of light-emitting diodes; and
    a shielding tape for affixing the reflection sheet, the prism sheet, the plurality of light-emitting diodes and the diffusion sheet within the receiving space,
    wherein a first color is colored at a plurality of first colored areas at a lower surface of the shielding tape corresponding to the plurality of light-emitting diodes and a second color is colored at a remaining area of the lower surface of the shielding tape other than the plurality of first colored areas.

2. The backlight unit of the liquid crystal display device as claimed in claim 1, wherein the first color colored at the plurality of first colored areas is a black color, and the second color colored at the remaining area is a white color.

3. The backlight unit of the liquid crystal display device as claimed in claim 1, wherein the first color colored at the plurality of first colored areas is a gray color, and the second color colored at the remaining area is a white color.

4. The backlight unit of the liquid crystal display device as claimed in claim 1, wherein the first color colored at the plurality of first colored areas is a black color, and the second color colored at the remaining area is a gray color.

5. The backlight unit of the liquid crystal display device of claim 1, wherein the first color colored at the plurality of first colored areas is a white color, and the second color colored at the remaining area is a silver color.

6. The backlight unit of the liquid crystal display device of claim 5, wherein a metal material is coated to color the silver color at the remaining area.

7. The backlight unit of the liquid crystal display device of claim 1, wherein the shielding tape is attached to a rim of the mold frame about a periphery of the receiving space with an adhesive.

8. The backlight unit of the liquid crystal display device of claim 1, wherein an upper surface of the shielding tape is colored black.

9. The backlight unit of the liquid crystal display device of claim 1, wherein an upper surface of the shielding tape is coated with an adhesive.

* * * * *